United States Patent Office 3,770,676
Patented Nov. 6, 1973

3,770,676
POLYVINYL CHLORIDE MOLDING COMPOSITIONS CONTAINING COPOLYMER OF VINYL CHLORIDE AND FUMARIC ACID DIESTER FOR POLYMETHACRYLIC ACID ALKYL ESTER, PROCESS, AND ARTICLES
Harald Dörffurt, Hangelar, and Wolfgang Pungs, Troisdorf, Germany, assignors to Dynamit Nobel Aktiengesellschaft, Troisdorf, Germany
No Drawing. Filed Mar. 18, 1971, Ser. No. 125,826
Claims priority, application Germany, Mar. 19, 1970,
P 20 13 031.8
Int. Cl. C08f 29/24
U.S. Cl. 260—23 XA    11 Claims

ABSTRACT OF THE DISCLOSURE

Molding compositions amenable to blow molding, having high dimensional stability. The compositions comprise:

(a) tactic vinyl chloride polymerizate,
(b) a minor proportion of a copolymer of vinyl chloride and fumaric acid diester or polymethacrylic acid alkyl ester.

A preferred composition contains ester wax as lubricant.

BACKGROUND

It is known that hollow articles and foils can be made from atactic polyvinyl chloride by blowing of extruded strands. Such bottles or other figures distinguish themselves by a high transparency, tensile strength and low weight compared to glass. A serious drawback, however, is the low dimensional stability under heat of the articles. For example, hollow bodies are deformed by the weight of the contents during filling at temperatures of pasteurization.

A decisive improvement of the dimensional stability under heat with a simultaneous preservation of the desirable properties of PVC could theoretically be achieved by stereospecific polymerization; however, no thin-walled moldings could until now be produced from these "tactic" polymerizates.

The desired higher dimensional stability under heat namely requires, on the other hand, elevated processing temperatures at the melt deformation, at which, however, already a decomposition of the material sets in since with an increase of dimensional stability under heat and tacticity, the thermostability does not increase simultaneously.

The difficulties of processing stereoregular PVC are described by O. C. Böckmann in "Stereoregular Cristalline PVC" (British Plastics, June 1965, p. 364). It is for this reason that so far only simple processing methods for molding compounds of tactic PVC, like film casting, calendering and extruding of tubes of smaller dimensions, have become known in industrial processes.

THE INVENTION

It has now been found that by choosing a tactic PVC compound of a certain formulation and by suitable additions and processing aids, an industrially safe fabrication of strand-blown, thin-walled hollow bodies and foils can be made possible if the below-named molding compounds are used.

Thus, the subject of invention are molding compositions on the basis of tactic PVC whose polymeric components consist of (a) tactic vinyl chloride polymerizates with K-values in the range of 55 to 65 and vicat values in the range of 95 to 100° C. and, relative to 100% by weight of these vinyl chloride polymerizates, (b) 0.2 to 15% by weight, preferably 0.5 to 10% by weight, vinyl chloride-fumaric diester copolymers with K-values in the range of 52 to 65, in which the polymerized portion of fumaric diester is 4 to 20% by weight of the copolymer, and in which the alcohol component in the diester has a chain length, e.g., in an alkyl group, of 10 to 25 C atoms, or/and the same amount of a polymerthacrylic alkyl ester. In the polymethacrylic esters the alcohol moiety of the ester can have 1–12, preferably 1–6, carbon atoms.

It is possible to use stabilizers limited relative to quantity and choice of material, as required for foodstuff purposes, e.g., according to the requirements of the German Federal Department of Health.

For many purposes, an addition of the component (b) in amounts of 1 to 5% by weight is preferred.

COMPONENTS

The said molding compositions can contain additionally, relative to the tactic PVC, 2 to 25% by weight, preferably 5 to 10% by weight, based on the weight of tactic vinyl chloride polymerizate, of known MBS and/or ABS graft polymers or copolymers and/or chlorinated polyethylene, possibly in mixture with PVC.

These additions increase the impact strength of the products.

MBS graft polymers or copolymers suitable for use in practice of the invention are polymers of methacrylic acid alkyl (e.g., lower alkyl having 1–4 carbon atoms such as methyl) ester, styrene and butadiene, which possibly contain copolymers of methacrylic ester/styrene or butadiene/methacrylic ester. The amounts of butadiene residues in the polymer can be 5 to 30% by weight; methacrylic methyl ester, 35 to 60% by weight; and styrene, 10 to 40% by weight. These polymerizates can be prepared in accordance with e.g. Belgian Pats. 671,228 and 671,229 or in accordance with British Pats. 963,372 and 1,001,437.

ABS graft polymers or copolymers are those based on acrylonitrile, styrene and butadiene, which possibly contain copolymers of acrylonitrile/styrene or butadiene/acrylonitrile. The amount of butadiene moieties in the polymer can be 5 to 10% by weight; acrylonitrile, 15 to 35% by weight; and styrene 45 to 80% by weight. These polymerizates can be prepared according to e.g.. the following literature references: Belgian Pats. 651,066; 665,-901; 671,228; British Pat. 1,001,437; French Pat. 1,430,214.

Chlorinated polyethylenes are those with Cl contents of about 20 to 50% by weight, preferably 35 to 45% by weight. The chlorination of such products is described in e.g. German Pat. 1,266,969. When using chlorinated polyethylene mixed with PVC, the chlorinated polyethylene can constitute 20 to 80% by weight of the admixture.

Tactic vinyl chloride polymerizates suitable for use in the practice of the invention are homopolymers of vinyl chloride and polymerizates with a portion of 0.2 to 10% by weight (based on the weight of the polymerizate) of another polymerized ethylenically unsaturated compound. The other ethylenically unsaturated monomer can be chlorinated low olefins like 1,2-trans-dichloro ethylene, trichloro ethylene; vinyl esters like vinyl acetate, vinyl propionate; vinyl ethers like vinyl ethyl ether; esters and derivatives of unsaturated carboxylic acids like acrylic ester, like acrylic methyl ester, methacrylic ester, like methacrylic methyl ester, acrylonitrile; low olefins like ethylene, propylene and other ethylenically unsaturated monomers commonly used in production of copolymers. The polymers of vinyl chloride should in the sense of the invention have K-values in the range of 55 to 65 and vicat values in the range of 95 to 100° C.

The tactic vinyl chloride polymerizates are distinguished by an ordering of chlorine atoms which is higher than the statistical ordering, i.e., higher than 50% syndiotacticity. The measured tacticity ranges from a lower value of from values 55 to 60 (depending on the measuring method used) to an upper value of about 85, generally in correspondence with falling polymerization temperatures below 0° C. or —5° C. to —40 or —60° C. Tactic PVC with tacticity of 65 or 68 to 72% is preferred.

The preparation of such polymerizates is described in e.g. British Pat. 855,213, German patent specification 1,111,826 and French Pats. 1,230,844; 1,259,267 and 1,438,017.

The VC/fumaric diester copolymers can be prepared according to German Pat. 1,091,757.

ADDITIVES

In general, there are further added to the molding compounds lubricants and stabilizers.

As lubricants, one may use for example montan ester waxes or fatty ester waxes, whose fatty acid component contains about 12 to 35 C atoms in the chain and whose alcohol component is a fatty alcohol with 12 to 35 carbon atoms in the chain or a diol residue of a diol having 2 to 20 carbon atoms. Such lubricants with preponderantly internal sliding action can be added in amounts of 0.2 to 3% by weight, preferably 0.5 to 1.5% by weight.

Further, paraffins, hyrocarbon waxes and/or low molecular polyethylene (molecular weights about 1,000 to 10,000) can be used; the said lubricants with preponderantly external sliding action being used in amounts of 0.1 to 0.8% by weight, preferably 0.2 to 0.5% by weight.

As stabilizers, the usual stabilizers like basic lead stearate, basic lead sulfate, organotin ester of BaCd-carboxylates can be used.

For the preparation of physiologically unobjectionable moldings, additions which can be used are dioctyl tin compounds like dioctyl tin thioglycolate, and Ca-Zn fatty acid soaps like stearate or stearate-sorbite, in amounts of 0.5 to 1.5, prossibly up to 3%, being preferred, since, among others, transparent moldings can thereby be made. These additives stabilize the composition with respect to aging, i.e., they prevent decomposition.

MISCELLANY

Surprisingly, steric PVC which up till now could only with great difficulties be processed can now be processed in the melt as molding compound according to the invention with only small additions of stabilizers. All kinds of moldings can be made, especially, however, thin-walled hollow wares, and foils which with the proper formulation are transparent.

The given limits, particularly of the tactic PVC, in respect of K-values and of vicats can be of importance since outside these limits (see examples) often no movement in the extruder or decomposition of the molding compound takes place. See Examples 12, 13.

According to the invention, it is now possible at one and the same time to achieve high dimensional stability under heat, transparency, and physiological acceptability, and to use the economical method of blow extrusion.

The molding compositions can have vicat dimensional stability of at least 85° based on VDE 0302.

The possibility of being able to employ small amounts of stabilizer permits compliance with official physiological standards. The high dimensional stability under heat makes possible the filling of foodstuffs and medicaments under sterile conditions. For instance, bottles can be filled with 88° C. hot liquids and, while hot, be closed by e.g. the pilferproof method, without deformation. The prior art PVC bottles, under the same filling conditions remain dimensionally stable only up to 70° C.

The mixing of the components can take place in a fluid mixer which heats up the components to about 120° C. The resulting composition can be introduced directly into the blow extruder, or can be converted to granules, which can be used in the blow extruder in the conventional way. As indicated, thin articles, and transparent articles can be made. This thickness can be less than 1 mm.

EXAMPLES

With an extruder screw diameter of 60 mm., a length of screw of 1.2 m. and a speed of 20 r.p.m., cylinder temperature at the entrance 150° C. and 185° C. at the nozzle, with ca. 6 strokes per minute, 400 cc. bottles are produced by blow moulding.

The processing properties given in the examples are in reference to the said extruder (60 mm. dia., 20 r.p.m.).

Data on the height of fall were determined with the same 400 cc. six-sided bottle in all examples and give the greatest height at which no fracture occurred.

The dimensional stability under heat according to vicat has been measured on 4 mm. pressed plates in accordance with VDE 0302. The compositions of the invention are likewise suited for the blowing of thin foils in the range of thickness of 10 to 100 microns. The properties of these foils are superior to those of atactic PVC and have ca. 15° C. higher dimensional stability under heat.

The examples that follow illustrate the invention further, but do not constitute any limitation thereto, since the molding compositions within the scope of the invention include other compositions. Other production procedures can be used.

Examples 3 through 8 and 13 through 16 constitute counter-examples.

Unless otherwise stated, percentages constitute percent by weight, amounts are parts by weight.

TABLE 1.—LUBRICANT VARIATION

| | Examples | | | | | | | |
|---|---|---|---|---|---|---|---|---|
| | 1 | 2 | 3 | 4 | 5 | 6 | 7 | 8 |
| Parts by weight: | | | | | | | | |
| Tactic VC-copol. 95% VC/5% 1,2-trans-dichloroethylene (K-value 62, vicat 97°) | 100 | 100 | 100 | 100 | 100 | 100 | 100 | 100 |
| Dioctyl tin thioglycolate | 1.5 | 1.3 | 1.5 | 1.3 | 1.3 | 1.5 | 1.4 | 1.5 |
| VC/fumaric dicetyl estercopol | 4 | 4 | 4 | 4 | 4 | 4 | 4 | 4 |
| Low-mol. wt. polyethylene | 0.3 | 0.2 | 0.3 | 0.3 | 0.3 | 0.25 | 0.3 | 0.3 |
| Variable lubricants: | | | | | | | | |
| Ester wax (alcohol comp. $C_{15-17}$/acid comp. $C_{17-19}$) | 1.0 | | | | | | | |
| Ester wax (acid component $C_{28-32}$/1,3 butane diol) | | 1.0 | | | | | | |
| Glycerin monoricinoleate | | | 2.0 | 1.5 | | | | |
| Palmityl/stearyl alcohol | | | | | 1.5 | | | |
| Stearic acid | | | | | | 1.5 | | |
| Butyl stearate | | | | | | | 1.5 | |
| Diethylene glycol monooleate | | | | | | | | 1.5 |
| Properties: | | | | | | | | |
| Processability in the extruder | Good | Good | (1) | Decomposition | | | | |
| Appearance of the bottle | (2) | (2) | (3) | | | | | |
| Height of fall of full bottle at 20° C. in cm | 50 | 50 | 30 | | | | | |
| Dimensional stability under heat (° C.) according to Vicat (5 kp., glycol bath) | 88 | 88 | 85 | | | | | |

¹ Rough.  ² Transparent.  ³ Streaky, transparent.

When using montan ester waxes, in place of fatty ester waxes, corresponding results are obtained.

cal products there are predominating ranges of chain length. So in Table 1 the first mentioned ester wax, a TABLE 2.—VARIATION OF STERIC PVC, OF PHYSIOLOGICALLY UNOBJECTIONABLE STABILIZERS AND OF POLYMERIC PROCESSING AIDS

| | Examples | | | | | | | |
|---|---|---|---|---|---|---|---|---|
| | 9 | 10 | 11 | 12 | 13 | 14 | 15 | 16 |
| Parts by weight: | | | | | | | | |
| Tactic VC-copol. 95% VC/5% 1,2-trans-dichloroethylene K-value 62; vicat 97° C | 100 | 100 | 100 | | | | 100 | 100 |
| K-value 66; vicat 97° C | | | | | 100 | | | |
| K-value 62; vicat 101° C | | | | | | 100 | | |
| Tactic PVC K-value 63; vicat 98° C | | | | 100 | | | | |
| Stabilizers: | | | | | | | | |
| Dioctyl tin thioglycolate | 1.5 | 1.2 | | 1.5 | 1.5 | 1.2 | 1.5 | 1.5 |
| Ca-Zn-stearate-sorbite | | | 3 | | | | | |
| Processing aids: | | | | | | | | |
| VC/fumaric didodecyl ester-copol | 4 | | 4 | 6 | 4 | 4 | | |
| Polymethacrylic methyl ester | | 4 | | | | | | |
| Low-mol. polyethylene | 0.3 | 0.2 | 0.3 | 0.4 | 0.3 | 0.3 | 0.3 | 0.3 |
| Ester wax (ca. C atoms of alcohol, 16/C atoms of acid, 18) | 1.0 | 1.2 | 1.0 | 2.0 | 1.0 | 1.2 | 1.0 | 2.0 |
| Properties: | | | | | | | | |
| Extruder processability | Good | Good | Good | Good | (1) | (1) | Decomposition | |
| Appearance of the bottle | (2) | | (3) | (2) | | | | |
| Height of fall of filled bottles at 20° C. in cm | 50 | 30 | | | | | | |

1 No feeding.   2 Clear, transparent.   3 Light brown, transparent.

TABLE 3.—IMPACT RESISTANT FORMULATIONS

| | Examples | | | | |
|---|---|---|---|---|---|
| | 17 | 18 | 19 | 20 | 21 |
| Parts by weight: | | | | | |
| Tactic VC-copol. 95% VC/5% 1,2-trans-dichloroethylene K-value 62; vicat 97° C | 100 | 100 | 100 | 100 | 100 |
| Dioctyl tin thioglycolate | 1.5 | 1.4 | 1.5 | 1.2 | 1.5 |
| VC/fumaric ester-copol | 2.0 | 2.0 | 2.0 | 2.2 | 2.0 |
| Ester wax (ca. C atoms of alcohol, 16/C atoms of acid, 18) | 1.0 | 1.1 | 0.8 | 1.0 | 1.0 |
| Low-mol. polyethylene | 0.3 | 0.2 | 0.3 | 0.4 | 0.3 |
| Modifiers: | | | | | |
| Methacrylic methyl ester/butadiene/styrene 49/29/22 percent by wt | 10 | 3 | | | |
| Acrylonitrile/butadiene/styrene 24/15/81 percent by wt | | | 10 | | |
| Chlorinated ND-polyethylene with 39% Cl | | | | 10 | |
| Chlorinated polyethylene (42% Cl)/PVC mixture 70/30 percent by wt | | | | | 10 |
| Properties: | | | | | |
| Processability in extruder | Good | Good | Good | Good | Good |
| Height of fall of filled bottle at 20° C. in cm | 180 | 70 | 150 | 120 | 100 |
| Dimensional stability under heat according to Vicat (5 kp./glycol bath) (° C) | 88 | 88 | 87 | 86 | 85 |

Example 22

Analogously to Example 9, but using a tactic VC-copolymer with (a) 3.5% and (b) 6.2% 1,2-trans-dichloroethylene, in the copolymer, the moldings having similar properties are obtained.

Example 23

Analogously to Example 9, but using a tactic copolymer of 95.5% vinyl chloride and 4.5% vinyl acetate, likewise good properties, equaling those given in Example 9, are obtained for foil produced from this molding compound.

Example 24

Analogous to Example 2, but using instead of the ester wax 1 wt. percent of montanic ester of $C_{18}$ to $C_{36}$ in the chains (predominating $C_{28}$), likewise the properties given in Example 2 are obtained.

The tacticity of VC polymers and copolymers, which is from 63 to 85 for purpose of the invention was measured on the basis of the methods of H. Germar et al., Macromol. Chem. 60 (1963), 106–109 by means of infrared spectroscopy.

In Examples 1 to 8 the tacticity is 68, in Examples 9 to 16 the value is 76, in all following examples the value is 72.

The VC/fumaric/diester copolymers of the examples are such as 6% fumaric dicetyl ester and 94% VC in Examples 1 to 8, 8% fumaric didodecyl ester and 92% VC in Examples 9 and 11 to 16, 7% fumaric ditridecyl ester and 93% VC in all following examples. Low. mol wt. polyethylene may have molecular weights of 1000 to 5000, in Examples 1 to 16 the mol. wt. was 4000. The chlorinated ND-polyethylene was produced of by chlorination of low-pressure PE of mol wt. 9000. Montanic ester waxes (montanic acid esters) are produced from bitumen or lignite and contain both paraffin hydrocarbons of about $C_{16}$ to $C_{38}$ and fatty acid esters (shortly esters wax), as defined above. Within the given range in technical products there are predominating ranges of chain length. So in Table 1 the first mentioned ester wax, a product of Farbwerke Hoechst, Frankfurt, trademark PA 525 the ester has predominately 15 to 17 C-atoms in the chain of the alcohol rest and 17 to 19 C-atoms in the chain of the acid rest; the second mentioned ester wax of Table 1, trademark PA 190 of Farbwerke Hoechst, accordingly is a ester mixture wherein predominate esters which acid rest has 28 to 32 C-atoms in the chain and which alcohol rest is the rest of 1,3 butane diol; the ester wax of Tables 2 and 3, trademark CPE 3614 of Dow Chemicals Co., in alcohol and acid rests has members of 10 to 25 C-atoms, wherein in the alcohol rest such of 16 C-atoms, in the acid rest such of 18 C-atoms predominate; in same manner in the montanic ester was (montanic ester) a chain length of 18 to 36 C-atoms is present, wherein 28 C-atoms predominate.

Thin-walled hollow articles and foils could not be produced when tactic VC polymers were used as base of molding compositions. Surprisingly from compositions, of the present invention such thin articles are achieved and so thin formed bodies of considerably better dimensional stability are now available.

What is claimed is:

1. Molding composition comprising:
   (a) tactic vinyl chloride polymerizates with K values of 55 to 65 and vicat values in the range of 95 to 100° C.,
   (b) 0.2 to 15% by weight of the tactic vinyl chloride polymerizate, of at least one of a copolymer of vinyl chloride and fumaric diester with a K value of 52 to 65, the alcohol residues of the fumaric diester having 10 to 25 carbon atoms and the fumaric diester residues being 4 to 20% by weight of the vinyl chloride-fumaric diester copolymer, and polymethacrylic alkyl ester, the alcohol residues of the polymethacrylic alkyl ester having 1–12 carbon atoms.

2. Molding composition according to claim 1, said tactic polyvinyl chloride polymerizate being a homopolymer or copolymer having 0.2 to 10% by weight of residues of another ethylenically unsaturated compound.

3. Molding composition according to claim 1, containing 2 to 25% by weight, based on the weight of tactic vinyl chloride polymerizate, of additive composed of at least one of the group methacrylic $C_1$–$C_4$ alkyl ester-styrene-butadiene graft polymers or copolymers, acrylonitrile-styrene-butadiene graft polymers or copolymers, and chlorinated polyethylene.

4. Molding composition according to claim 1, and containing as stabilizer at least one of the group dioctyl tin thioglycolate, calcium fatty acid soap, and zinc fatty acid soap.

5. Molding composition according to claim 1, and containing as a lubricant at least one from the group montan ester wax, fatty ester wax in which the acid moiety has a carbon atom chain length of 12 to 35 carbon atoms, the alcohol moiety has a carbon atom chain length of 12 to 35 carbon atoms, or is a residue of a diol having 2 to 20 carbon atoms.

6. Molding composition according to claim 1, amenable to blow molding and having a vicat dimensional stability of at least 85° C. based on VDE 0302, and containing as a lubricant at least one from the group montan ester wax, fatty ester wax in which the acid moiety has a carbon atom chain length of 12 to 35 carbon atoms, the alcohol moiety is a residue of a monohydric alcohol having a carbon atom chain length of 12 to 35 carbon atoms or a residue of a diol having a carbon atom chain length of 2 to 20 carbon atoms.

7. Thin plastic article, of thickness less than 1 mm., formed of a molding composition according to claim 6.

8. Molding composition according to claim 1, component (b) being said copolymer.

9. Molding composition according to claim 1, component (b) being said polymethacrylic alkyl ester.

10. Article according to claim 7, component (b) of the molding composition being said copolymer.

11. Article according to claim 7, component (b) of the molding composition being said polymethacrylic acid ester.

References Cited

UNITED STATES PATENTS

| | | | |
|---|---|---|---|
| 2,897,169 | 7/1959 | Dazzi | 260—899 X |
| 3,563,935 | 2/1971 | Beckmann et al. | 260—899 X |
| 3,367,997 | 2/1968 | Smith | 260—899 X |
| 3,558,566 | 1/1971 | Balwé et al. | 260—78.5 |

DONALD E. CZAJA, Primary Examiner

E. C. RZUCIDLO, Assistant Examiner

U.S. Cl. X.R.

260—78.5 CL, 876 R, 897 C, 899